United States Patent
Li (10) Patent No.: US 10,235,548 B2
(45) Date of Patent: Mar. 19, 2019

(54) METHOD FOR SETTING FINGERPRINT SENSOR INTERRUPT THRESHOLD, APPARATUS, AND TERMINAL DEVICE

(71) Applicant: Huawei Technologies Co., Ltd., Shenzhen, Guangdong (CN)

(72) Inventor: Danhong Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/527,273

(22) PCT Filed: Apr. 21, 2015

(86) PCT No.: PCT/CN2015/077049
§ 371 (c)(1),
(2) Date: May 16, 2017

(87) PCT Pub. No.: WO2016/168982
PCT Pub. Date: Oct. 27, 2016

(65) Prior Publication Data
US 2018/0032785 A1 Feb. 1, 2018

(51) Int. Cl.
*G06K 9/60* (2006.01)
*G06K 9/00* (2006.01)
(Continued)

(52) U.S. Cl.
CPC ......... *G06K 9/00013* (2013.01); *G06F 3/011* (2013.01); *G06F 3/0484* (2013.01);
(Continued)

(58) Field of Classification Search
CPC .............................. G06K 9/00013–2009/0006
See application file for complete search history.

(56) References Cited

U.S. PATENT DOCUMENTS 6,535,622 B1 * 3/2003 Russo ............... G06K 9/00013
340/5.83
2004/0096087 A1 5/2004 Funahashi
(Continued)

FOREIGN PATENT DOCUMENTS

CN 1860490 A 11/2006
CN 103778420 A 5/2014
(Continued)

OTHER PUBLICATIONS

C. Skeppstedt; "Product Specification FPC1020—Revision PB3"; Fingerprint Cards AB; Apr. 28, 2014; 36 pages.
(Continued)

*Primary Examiner* — Brian Werner (57) ABSTRACT

The present invention provides a method: obtaining background noise of a wakeup region on a fingerprint sensor in a terminal device, where the wakeup region is a region for detecting whether the fingerprint sensor is touched; adding a preset safety margin to the background noise, to obtain a first threshold; and determining, according to the first threshold and a preset safety value, an interrupt threshold for the fingerprint sensor to generate an interrupt signal, where the interrupt threshold is used to instruct the fingerprint sensor to generate an interrupt signal, so as to wake up a central processing unit CPU of the terminal device, and the safety value is used to prevent the fingerprint sensor from erroneously triggering an interrupt signal to wake up the CPU.

12 Claims, 3 Drawing Sheets

(51) Int. Cl.
  *G06F 3/0484* (2013.01)
  *G06F 3/01* (2006.01)
  *G06F 13/24* (2006.01)
  *H04W 48/04* (2009.01)
  *G06F 17/11* (2006.01)

(52) U.S. Cl.
  CPC .......... *G06F 13/24* (2013.01); *G06K 9/0002* (2013.01); *G06K 9/00087* (2013.01); *G06K 9/00993* (2013.01); *H04W 48/04* (2013.01); *G06F 17/11* (2013.01)

(56) References Cited

U.S. PATENT DOCUMENTS

| | | | |
|---|---|---|---|
| 2007/0003110 A1 | 1/2007 | Gutta et al. | |
| 2008/0196945 A1* | 8/2008 | Konstas | G06F 3/03547 178/18.03 |
| 2012/0071149 A1* | 3/2012 | Bandyopadhyay | G06F 1/1643 455/418 |
| 2015/0078633 A1 | 3/2015 | Hung | |
| 2015/0205438 A1 | 7/2015 | Kremin et al. | |

FOREIGN PATENT DOCUMENTS

| | | |
|---|---|---|
| CN | 104391635 A | 3/2015 |
| JP | H11-134477 A | 5/1999 |
| JP | 2004-154419 A | 6/2004 |
| JP | 2004-355367 A | 12/2004 |
| JP | 2013142907 A | 7/2013 |
| KR | 20060090821 A | 8/2006 |
| KR | 20120105445 A | 9/2012 |

OTHER PUBLICATIONS

"AN0028: Low Energy Sensor Interface—Capacitive Sense"; Silicon Labs; Mar. 16, 2012; 15 pages.

J. Gabay; "Low-Energy Touch Sensing Extends Battery Life"; retrieved from the internet https://www.digikey.com/en/articles/techzone/2011/sep/low-energy-touch-sensing-extends-battery-life; published Sep. 16, 2011; 4 pages.

"Touch Sensor Controller"; Fujitsu; Jul. 25, 2009; 34 pages.

P. Prendergast; "SNR Measurement Realities for Capacitive Touchscreens"; Electronic Design (http://www.electronicdesign.com); Dec. 2011; 5 pages.

* cited by examiner

METHOD FOR SETTING FINGERPRINT SENSOR INTERRUPT THRESHOLD, APPARATUS, AND TERMINAL DEVICE

CROSS REFERENCE TO RELATED APPLICATIONS

The present application claims priority under 35 U.S.C. § 365 to International Patent Application No. PCT/CN2015/077049 filed Apr. 21, 2015, which is incorporated herein by reference into the present disclosure as if fully set forth herein.

TECHNICAL FIELD

The present invention relates to a fingerprint recognition technology, and in particular, to a method for setting a fingerprint sensor interrupt threshold, an apparatus, and a terminal device.

BACKGROUND

Currently, fingerprint recognition solutions commonly used on terminal devices may be categorized into an active mode and a passive mode. In a passive-mode fingerprint recognition solution, a central processing unit (English: Central Processing Unit, CPU for short) of a terminal device is first woken up by pressing a button; and then, a fingerprint image is obtained by means of continuous polling by the CPU, and whether the fingerprint image matches a fingerprint in a fingerprint library is verified. In an active-mode fingerprint recognition solution, after a finger touches a wakeup region on a fingerprint sensor, the fingerprint sensor generates an interrupt signal, to actively wake up a CPU to collect a fingerprint image. The wakeup region is used to detect whether the fingerprint sensor is touched. Compared with the passive-mode fingerprint recognition solution, the active-mode fingerprint recognition solution greatly reduces a work load of a CPU, but also brings the following challenge: how to set a proper interrupt threshold for a fingerprint sensor so as to ensure that an interrupt can be triggered but is not erroneously triggered.

To address the foregoing problem, a current method in the industry is to manually adjust a parameter for a fingerprint sensor in advance. The parameter is a safety value verified during production.

However, sizes of electrical signals generated by fingers of users may be mutually different, hardware such as fingerprint sensors is not completely consistent either, and weather and an environment are also constantly changing. Therefore, apparently, an interrupt threshold adjusted in advance cannot be applied to all users.

SUMMARY

Embodiments of the present invention provide a method for setting a fingerprint sensor interrupt threshold, an apparatus, and a terminal device, to resolve a prior-art problem that an interrupt threshold that is of a fingerprint sensor and that is adjusted in advance cannot be applied to all users because the interrupt threshold cannot adapt to different weather conditions and hardware environments.

According to a first aspect, the present invention provides a method for setting a fingerprint sensor interrupt threshold, including:

obtaining background noise of a wakeup region on a fingerprint sensor in a terminal device, where the wakeup region is a region for detecting whether the fingerprint sensor is touched;

adding a preset safety margin to the background noise, to obtain a first threshold; and determining, according to the first threshold and a preset safety value, an interrupt threshold for the fingerprint sensor to generate an interrupt signal, where the interrupt threshold is used to instruct the fingerprint sensor to generate an interrupt signal, so as to wake up a CPU of the terminal device, and the safety value is used to prevent the fingerprint sensor from erroneously triggering an interrupt signal to wake up the CPU.

With reference to the first aspect, in a first possible implementation manner of the first aspect, the determining, according to the first threshold and a preset safety value, an interrupt threshold for the fingerprint sensor to generate an interrupt signal includes:

if the first threshold is less than the preset safety value, using the first threshold as the interrupt threshold for the fingerprint sensor to generate an interrupt signal; or if the first threshold is greater than the safety value, using the safety value as the interrupt threshold for the fingerprint sensor to generate an interrupt signal.

With reference to the first aspect or the first possible implementation manner of the first aspect, in a second possible implementation manner of the first aspect, the obtaining background noise of a wakeup region includes:

if there are M wakeup regions on the fingerprint sensor, obtaining background noise of each wakeup region; and using the largest background noise of the obtained M pieces of background noise as background noise of the M wakeup regions, where M is an integer greater than 1.

With reference to any one of the first aspect or the first to second possible implementation manners of the first aspect, in a third possible implementation manner of the first aspect, the obtained background noise of the wakeup region meets the following the formula:

$$A_n = \frac{a_1 + a_2 + a_3 + \ldots + a_n}{n},$$

where $A_n$ represents the background noise of the wakeup region, $a_i$ represents a pixel value of an $i^{th}$ local region in the wakeup region, i is an integer not less than 1 and not greater than n, n represents a quantity of local regions included in the wakeup region, and n is an integer greater than 0.

With reference to any one of the first aspect or the first to third possible implementation manners of the first aspect, in a fourth possible implementation manner of the first aspect, the safety value is 80, and the safety margin is 30.

According to a second aspect, the present invention provides a fingerprint recognition apparatus, including:

a first obtaining unit, configured to obtain background noise of a wakeup region on a fingerprint sensor in a terminal device, where the wakeup region is a region for detecting whether the fingerprint sensor is touched;

a second obtaining unit, configured to add a preset safety margin to the background noise, to obtain a first threshold; and a determining unit, configured to determine, according to the first threshold and a preset safety value, an interrupt threshold for the fingerprint sensor to generate an interrupt signal, where the interrupt threshold is used to instruct the fingerprint sensor to generate an interrupt signal, so as to wake up a central processing unit CPU of the terminal device, and the safety value is used to prevent the fingerprint sensor from erroneously triggering an interrupt signal to wake up the CPU.

With reference to the second aspect, in a first possible implementation manner of the second aspect, the determining unit is specifically configured to:

if the first threshold is less than the preset safety value, use the first threshold as the interrupt threshold for the fingerprint sensor to generate an interrupt signal; or if the first threshold is greater than the safety value, using the safety value as the interrupt threshold for the fingerprint sensor to generate an interrupt signal.

With reference to the second aspect or the first possible implementation manner of the second aspect, in a second possible implementation manner of the second aspect, the first obtaining unit is specifically configured to:

if there are M wakeup regions on the fingerprint sensor, obtain background noise of each wakeup region; and use the largest background noise of the obtained M pieces of background noise as background noise of the M wakeup regions, where M is an integer greater than 1.

With reference to any one of the second aspect or the first to second possible implementation manners of the second aspect, in a third possible implementation manner of the second aspect, the obtained background noise of the wakeup region meets the following the formula:

$$A_n = \frac{a_1 + a_2 + a_3 + \ldots + a_n}{n},$$

where $A_n$ represents the background noise of the wakeup region, $a_i$ represents a pixel value of an $i^{th}$ local region in the wakeup region, i is an integer not less than 1 and not greater than n, n represents a quantity of local regions included in the wakeup region, and n is an integer greater than 0.

With reference to any one of the second aspect or the first to third possible implementation manners of the second aspect, in a fourth possible implementation manner of the second aspect, the safety value is 80, and the safety margin is 30.

According to a third aspect, the present invention provides a terminal device, including:

a fingerprint sensor, a memory, and a CPU, where:

the fingerprint sensor is configured to generate an interrupt signal to wake up the CPU;

the memory is configured to store a software program and a module; and the CPU is configured to run the software program and the module stored in the memory, to perform the following operations: obtaining background noise of a wakeup region on the fingerprint sensor, where the wakeup region is a region for detecting whether the fingerprint sensor is touched; adding a preset safety margin to the background noise, to obtain a first threshold; and determining, according to the first threshold and a preset safety value, an interrupt threshold for the fingerprint sensor to generate an interrupt signal, where the interrupt threshold is used to instruct the fingerprint sensor to generate an interrupt signal, so as to wake up the CPU, and the safety value is used to prevent the fingerprint sensor from erroneously triggering an interrupt signal to wake up the CPU.

With reference to the third aspect, in a first possible implementation manner of the third aspect, when determining, according to the first threshold and the preset safety value, the interrupt threshold for the fingerprint sensor to generate an interrupt signal, the CPU is specifically configured to:

if the first threshold is less than the preset safety value, use the first threshold as the interrupt threshold for the fingerprint sensor to generate an interrupt signal; or if the first threshold is greater than the safety value, use the safety value as the interrupt threshold for the fingerprint sensor to generate an interrupt signal.

With reference to the third aspect or the first possible implementation manner of the third aspect, in a second possible implementation manner of the third aspect, when obtaining the background noise of the wakeup region, the CPU is specifically configured to:

if there are M wakeup regions on the fingerprint sensor, obtain background noise of each wakeup region; and use the largest background noise of the obtained M pieces of background noise as background noise of the M wakeup regions, where M is an integer greater than 1.

With reference to any one of the third aspect or the first to second possible implementation manners of the third aspect, in a third possible implementation manner of the third aspect, the obtained background noise of the wakeup region meets the following the formula:

$$A_n = \frac{a_1 + a_2 + a_3 + \ldots + a_n}{n},$$

where $A_n$ represents the background noise of the wakeup region, $a_i$ represents a pixel value of an $i^{th}$ local region in the wakeup region, i is an integer not less than 1 and not greater than n, n represents a quantity of local regions included in the wakeup region, and n is an integer greater than 0.

With reference to any one of the third aspect or the first to third possible implementation manners of the third aspect, in a fourth possible implementation manner of the third aspect, the safety value is 80, and the safety margin is 30.

According to a fourth aspect, the present invention provides a computer-readable storage medium that stores one or more programs, where the one or more programs include an instruction, and when the instruction is executed by a portable electronic device that includes multiple application programs, the portable electronic device performs the method according to any implementation manner of the first aspect or the first to fourth possible implementation manners of the first aspect.

According to the solutions provided in the present invention, an optimal interrupt threshold is obtained by collecting background noise of a fingerprint sensor in real time, to enable a dynamic interrupt threshold of the fingerprint sensor to adapt to different weather conditions and hardware environments at any time, thereby improving recognition efficiency and recognition accuracy of the fingerprint sensor in recognizing fingerprints of different users.

DETAILED DESCRIPTION

Embodiments of the present invention provide a method for setting a fingerprint sensor interrupt threshold, an apparatus, and a terminal device. An optimal interrupt threshold is obtained by collecting background noise of a fingerprint sensor in real time, to enable a dynamic interrupt threshold of the fingerprint sensor to adapt to different weather conditions and hardware environments at any time, thereby improving recognition efficiency and recognition accuracy of the fingerprint sensor in recognizing fingerprints of different users.

The technical solutions in the present invention are described in the following with reference to the accompany drawings and the embodiments in this specification.

Figure 1:
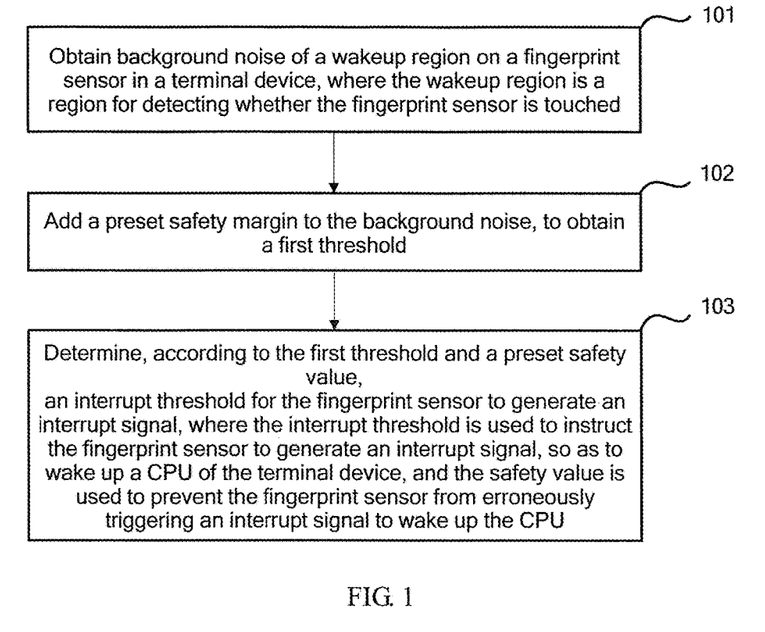
FIG. 1 is a flowchart of a method for setting a fingerprint sensor interrupt threshold according to an embodiment of the present invention.

Referring to FIG. 1, an embodiment of the present invention provides a method for setting a fingerprint sensor interrupt threshold. An implementation process of the method is as follows:

Step 101: Obtain background noise of a wakeup region on a fingerprint sensor in a terminal device, where the wakeup region is a region for detecting whether the fingerprint sensor is touched.

The fingerprint sensor is a fingerprint recognition chip, and may be understood as a processor. The fingerprint sensor is equipped with a recognition region that can be used to capture a fingerprint image. Particularly, on the recognition region, a region that can be used to capture a fingerprint image and can be further used to detect, in real time, whether the recognition region is touched is referred to as a wakeup region. The wakeup region may further include several local regions, and each local region is a pixel. A shape of the wakeup region is determined by a chip designing party, and may be a square, a circle, a ring, or the like.

Background noise of the wakeup region varies with different weather conditions (for example, fine weather or raining) and hardware environments (for example, in the south or in the north). For example, background noise of the wakeup region in an environment with high humidity is higher than background noise in an environment with low humidity. The obtaining background noise of a wakeup region is obtaining a pixel value of the wakeup region when the wakeup region is not touched by any object. The obtained background noise of the wakeup region meets the following formula:

$$A_n = \frac{a_1 + a_2 + a_3 + \ldots + a_n}{n},$$

where $A_n$ represents the background noise of the wakeup region, $a_i$ represents a pixel value of an $i^{th}$ local region in the wakeup region, i is an integer not less than 1 and not greater than n, n represents a quantity of local regions included in the wakeup region, and n is an integer greater than 0. During fingerprint chip design, in a case of not affecting other factors such as power consumption, a recognition capability and recognition accuracy of the wakeup region increase as n increases.

Optionally, if there are M wakeup regions on the fingerprint sensor, background noise of each wakeup region may be first obtained, and then the largest background noise of the obtained M pieces of background noise is used as background noise of the M wakeup regions, where M is an integer greater than 1.

When the fingerprint sensor has multiple wakeup regions, the fingerprint sensor may be enabled to successfully trigger an interrupt signal to wake up a CPU, provided that any wakeup region determines that a pixel value exceeds a specified interrupt threshold. The pixel value is obtained by performing digitalization processing on an electrical quantity (such as a capacitance, a light intensity, or an acoustic quantity) generated because the wakeup region is touched. To prevent the fingerprint sensor from erroneously triggering an interrupt signal, only the largest background noise of multiple pieces of background noise corresponding to the multiple wakeup regions may be selected as background noise of each wakeup region.

Step 102: Add a preset safety margin to the background noise, to obtain a first threshold.

Step 103: Determine, according to the first threshold and a preset safety value, an interrupt threshold for the fingerprint sensor to generate an interrupt signal, where the interrupt threshold is used to instruct the fingerprint sensor to generate an interrupt signal, so as to wake up a CPU of the terminal device, and the safety value is used to prevent the fingerprint sensor from erroneously triggering an interrupt signal to wake up the CPU.

In this embodiment of the present invention, after the interrupt threshold is determined, the interrupt threshold may be written into the fingerprint sensor. When determining that a pixel value obtained when a finger touches the wakeup region at a time is greater than the interrupt threshold, the fingerprint sensor generates an interrupt signal, and sends the interrupt signal to the CPU of the terminal device. After receiving the interrupt signal, the CPU obtains, from the fingerprint sensor, a fingerprint image captured by the fingerprint sensor when the finger touches the wakeup region at this time, and matches the fingerprint image with a fingerprint in a fingerprint library. If there is a match, fingerprint verification is complete. After fingerprint recognition and matching are successful, a user may perform a fingerprint recognition operation such as unlocking a screen or authorizing payment via fingerprint.

Optionally, in this embodiment of the present invention, a process of determining an interrupt threshold for the fingerprint sensor to generate an interrupt signal is as follows: If the first threshold is less than the preset safety value, the first threshold is used as the interrupt threshold for the fingerprint sensor to generate an interrupt signal; or if the first threshold is greater than the safety value, the safety value is used as the interrupt threshold for the fingerprint sensor to generate an interrupt signal. When the first threshold is equal to the safety value, either the first threshold or the safety value may be used as the interrupt threshold for the fingerprint sensor to generate an interrupt signal.

Generally, the first threshold is less than or equal to the safety value. In this case, if the first threshold is selected as the interrupt threshold of the fingerprint sensor, a pixel value that falls between the first threshold and the safety value may also normally trigger the fingerprint sensor to generate an interrupt signal. This expands a recognition range of the fingerprint sensor. However, when the first threshold is greater than the safety value, the first threshold may be considered as an unsuitable value in this case. For example, if the wakeup region is touched by an object when the background noise of the wakeup region is obtained, the obtained background noise of the wakeup region is consequently too large, further causing the first threshold to be greater than the safety value. For another example, when the fingerprint sensor is damaged, the first threshold may be also caused to be greater than the safety value; in this case, the preset safety value should be selected, instead of the first threshold, as the interrupt threshold of the fingerprint sensor.

Both the safety value and the safety margin may be system parameters. The safety value is a value for ensuring that the fingerprint sensor does not erroneously trigger an interrupt signal. The safety margin is a value for ensuring that the fingerprint sensor does not erroneously trigger an interrupt signal after a sum value of the background noise of the wakeup region and the safety margin is used as the interrupt threshold. For example, when a safety value of a fingerprint sensor is 90, and a safety margin 40, if background noise obtained through measurement is 30, a sum of the background noise and the safety margin is less than the safety value. Therefore, 70 may be used as an interrupt threshold of the fingerprint sensor. Before the background noise expires, provided that a pixel value generated when the fingerprint sensor is touched by an object is greater than 70, the fingerprint sensor considers that a wakeup region is touched and therefore generates an interrupt signal to wake up a CPU to perform fingerprint recognition. If a pixel value generated when the fingerprint sensor is touched by an object is less than 70, the fingerprint sensor considers that a wakeup region is touched and does not wake up a CPU. This avoids a case in which a CPU is caused to wake up when an object, such as a key, accidentally rubs the wakeup region of the fingerprint sensor. Both the safety value and the safety margin may be obtained by means of a field test. The field test may an experiment in which a large quantity of terminal device samples are put into a climatic test chamber, and tests in high temperature high humidity and low temperature low humidity are performed cyclically, to obtain a value that can prevent the fingerprint sensor in the terminal device from automatically triggering an interrupt signal.

Preferably, in this embodiment of the present invention, it is discovered through multiple times of simulation tests that the safety value may be set to 80, and the safety margin may be set to 30.

Different weather conditions (for example, fine weather or raining) and hardware environments (for example, in the south or in the north) affect the background noise of the wakeup region and a pixel value generated when a finger touches the wakeup region. Therefore, a fixed and constant interrupt threshold cannot ensure accuracy of the fingerprint sensor in recognizing a fingerprint. For example, an interrupt threshold may ensure that the fingerprint sensor operates normally in an environment with high humidity, but the same interrupt threshold may cause the fingerprint sensor difficult to be triggered in an environment with low humidity. To address this problem, in this embodiment of the present invention, a fingerprint recognition operation such as unlocking a screen or authorizing payment via fingerprint may be performed on the fingerprint sensor by using the interrupt threshold determined in steps 101 to 103; or steps 101 to 103 are repeated after each specified duration, to determine a new interrupt threshold according to a current weather condition and hardware environment, where the interrupt threshold is used as a determining basis for the fingerprint sensor to subsequently generate an interrupt signal.

To describe the technical solutions in the present invention more clearly, the following further describes the foregoing process by using an embodiment. It should be noted that this embodiment is merely an embodiment of the present invention, and constitutes no limitation on the present invention.

Figure 2:
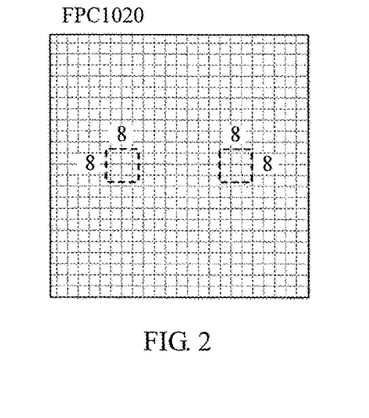
FIG. 2 is a schematic diagram of a fingerprint sensor whose model is FPC1020 according to an embodiment of the present invention.
Figure 3:
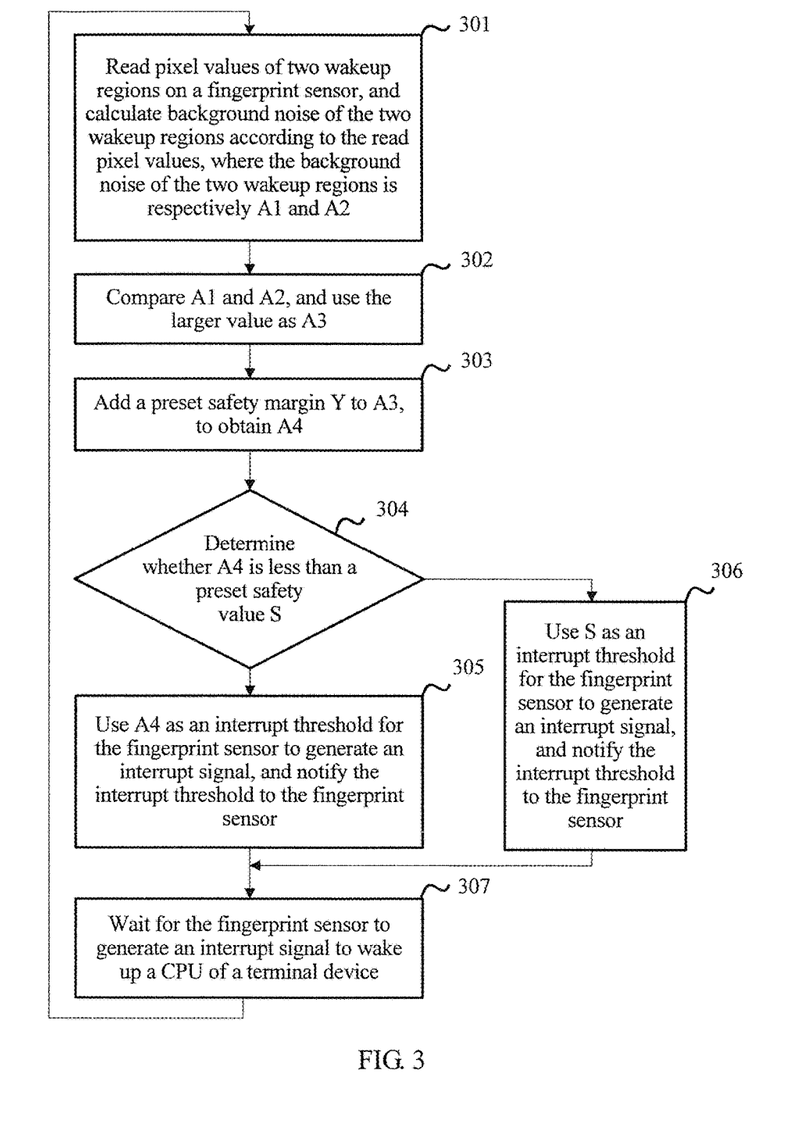
FIG. 3 is a flowchart of applying a method for setting a fingerprint sensor interrupt threshold to a fingerprint sensor whose model is FPC1020 according to an embodiment of the present invention.

FIG. 2 shows a fingerprint sensor whose model is FPC1020. In the fingerprint sensor of this model, two 8*8 pixel regions are used as wakeup regions. The wakeup regions and another recognition region can be used to capture a fingerprint image, but only the wakeup regions can be used to detect whether the fingerprint sensor is touched. As shown in FIG. 3, a method process of applying the technical solutions in the present invention to the fingerprint sensor is as follows:

Step 301: Read pixel values of the two wakeup regions on the fingerprint sensor, and calculate background noise of the two wakeup regions according to the read pixel values, where the background noise of the two wakeup regions is respectively A1 and A2.

Specifically, the background noise of each wakeup region may be calculated by using the following formula:

$$A_n = \frac{\sum_{i=1}^{64} a_i}{64},$$

where $a_i$ represents a pixel value of an $i^{th}$ local region in the wakeup region.

Step 302: Compare A1 and A2, and use the larger value as A3.

Step 303: Add a preset safety margin Y to A3, to obtain A4.

Step 304: Determine whether A4 is less than a preset safety value S. If yes, perform step 305; otherwise, perform step 306.

Step 305: Use A4 as an interrupt threshold for the fingerprint sensor to generate an interrupt signal, and notify the interrupt threshold to the fingerprint sensor.

Step 306: Use S as an interrupt threshold for the fingerprint sensor to generate an interrupt signal, and notify the interrupt threshold to the fingerprint sensor.

Step 307: Wait for the fingerprint sensor to generate an interrupt signal to wake up a CPU of a terminal device, and return to step 301.

Figure 4:
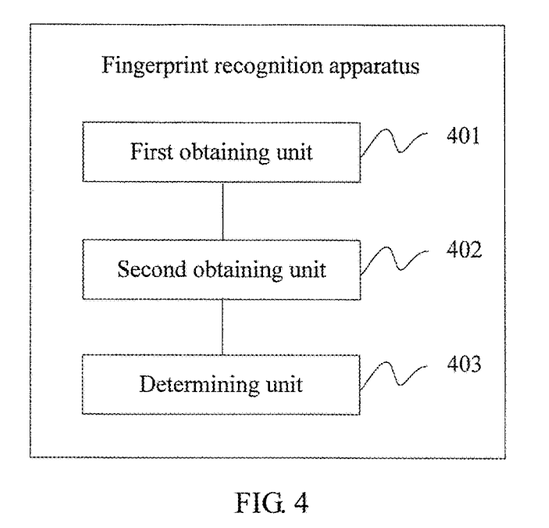
FIG. 4 is a schematic structural diagram of a fingerprint recognition apparatus according to an embodiment of the present invention.

Referring to FIG. 4, an embodiment of the present invention provides a fingerprint recognition apparatus, which is used to implement the method for setting a fingerprint sensor interrupt threshold shown in FIG. 1 of the present invention. The apparatus includes:

a first obtaining unit 401, configured to obtain background noise of a wakeup region on a fingerprint sensor in a terminal device, where the wakeup region is a region for detecting whether the fingerprint sensor is touched;

a second obtaining unit 402, configured to add a preset safety margin to the background noise, to obtain a first threshold; and a determining unit 403, configured to determine, according to the first threshold and a preset safety value, an interrupt threshold for the fingerprint sensor to generate an interrupt signal, where the interrupt threshold is used to instruct the fingerprint sensor to generate an interrupt signal, so as to wake up a CPU of the terminal device, and the safety value is used to prevent the fingerprint sensor from erroneously triggering an interrupt signal to wake up the CPU.

Optionally, if the first threshold is less than the preset safety value, the determining unit 403 uses the first threshold as the interrupt threshold for the fingerprint sensor to generate an interrupt signal; or if the first threshold is greater than the safety value, the determining unit 403 uses the safety value as the interrupt threshold for the fingerprint sensor to generate an interrupt signal.

Optionally, the first obtaining unit 401 is specifically configured to: if there are M wakeup regions on the fingerprint sensor, obtain background noise of each wakeup region, and use the largest background noise of the obtained M pieces of background noise as background noise of the M wakeup regions, where M is an integer greater than 1.

Optionally, the obtained background noise of the wakeup region meets the following formula:

$$A_n = \frac{a_1 + a_2 + a_3 + \ldots + a_n}{n},$$

where $A_n$ represents the background noise of the wakeup region, $a_i$ represents a pixel value of an $i^{th}$ local region in the wakeup region, i is an integer not less than 1 and not greater than n, n represents a quantity of local regions included in the wakeup region, and n is an integer greater than 0.

Optionally, the safety value is 80, and the safety margin is 30.

Figure 5:
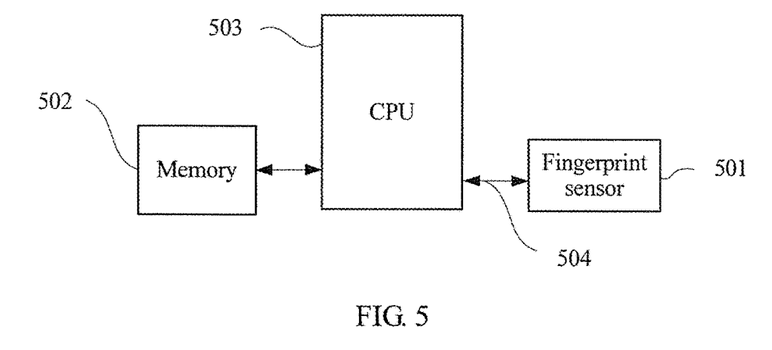
FIG. 5 is a schematic structural diagram of a terminal device according to an embodiment of the present invention.

Referring to FIG. 5, an embodiment of the present invention further provides a terminal device. The terminal device includes:

a fingerprint sensor 501, a memory 502, and a CPU 503, where these components communicate by using one or more communications buses or signal cables 504.

It should be noted that, FIG. 5 shows merely an example of the terminal device, and an actual terminal device may specifically have more or fewer components than those shown in FIG. 5, may combine two or more components, or may have a different component configuration. The components shown in FIG. 5 may be implemented in hardware, software, or a combination of hardware and software, where the hardware or the combination of hardware and software includes one or more signal processing and/or dedicated integrated circuits.

The following describes in detail the terminal device for fingerprint interrupt wakeup provided in this embodiment.

The fingerprint sensor 501 is configured to generate an interrupt signal to wake up the CPU 503.

The memory 502 is configured to store a software program and a module. The memory 502 may include a high-speed random access memory, and may further include a non-volatile memory such as at least one of a magnetic disk storage component or a flash memory component, or another volatile solid-state memory component.

The CPU 503 is a control center of the terminal device and connects parts of the entire terminal device by using various interfaces and cables, and is configured to run the software program and the module stored in the memory 502, to perform the following operations:

obtaining background noise of a wakeup region on the fingerprint sensor 501, where the wakeup region is a region for detecting whether the fingerprint sensor is touched; adding a preset safety margin to the background noise, to obtain a first threshold; and determining, according to the first threshold and a preset safety value, an interrupt threshold for the fingerprint sensor 501 to generate an interrupt signal, where the interrupt threshold is used to instruct the fingerprint sensor to generate an interrupt signal, so as to wake up the CPU, and the safety value is used to prevent the fingerprint sensor from erroneously triggering an interrupt signal to wake up the CPU.

Optionally, when determining, according to the first threshold and the preset safety value, the interrupt threshold for the fingerprint sensor to generate an interrupt signal, if the first threshold is less than the preset safety value, the CPU 503 uses the first threshold as the interrupt threshold for the fingerprint sensor to generate an interrupt signal; or if the first threshold is greater than the safety value, the CPU 503 uses the safety value as the interrupt threshold for the fingerprint sensor to generate an interrupt signal.

Optionally, when obtaining the background noise of the wakeup region, the CPU 503 is specifically configured to: if there are M wakeup regions on the fingerprint sensor 501, obtain background noise of each wakeup region, and use the largest background noise of the obtained M pieces of background noise as background noise of the M wakeup regions, where M is an integer greater than 1.

Optionally, the obtained background noise of the wakeup region meets the following formula:

$$A_n = \frac{a_1 + a_2 + a_3 + \ldots + a_n}{n},$$

where $A_n$ represents the background noise of the wakeup region, $a_i$ represents a pixel value of an $i^{th}$ local region in the wakeup region, i is an integer not less than 1 and not greater than n, n represents a quantity of local regions included in the wakeup region, and n is an integer greater than 0.

Optionally, the safety value is 80, and the safety margin is 30.

In addition, an embodiment of the present invention further provides a computer-readable storage medium that stores one or more programs. The one or more programs include an instruction, and when the instruction is executed by a portable electronic device that includes multiple application programs, the portable electronic device performs the method for setting a fingerprint sensor interrupt threshold according to any of the foregoing cases.

In summary, according to the technical solutions provided in the embodiments of the present invention, an optimal interrupt threshold is obtained by collecting background noise of a fingerprint sensor in real time, to enable a dynamic interrupt threshold of the fingerprint sensor to adapt to different weather conditions and hardware environments at any time, thereby improving recognition efficiency and recognition accuracy of the fingerprint sensor in recognizing fingerprints of different users.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A method for setting a fingerprint sensor interrupt threshold, the method comprising:
    obtaining background noise of a wakeup region on a fingerprint sensor in a terminal device, wherein the wakeup region is a region for detecting whether the fingerprint sensor is touched;
    adding a safety margin to the background noise, to obtain a first threshold;
    determining, according to the first threshold and a safety value, an interrupt threshold for the fingerprint sensor for instructing the fingerprint sensor to generate an interrupt signal for waking up a central processing unit (CPU) of the terminal device, wherein the safety value is configured to prevent the fingerprint sensor from erroneously triggering an interrupt signal to wake up the CPU; and
    wherein determining, according to the first threshold and the safety value, the interrupt threshold for the fingerprint sensor comprises:
        when the first threshold is less than the safety value, using the first threshold as the interrupt threshold for the fingerprint sensor; or
        when the first threshold is greater than the safety value, using the safety value as the interrupt threshold for the fingerprint sensor.

2. A method for setting a fingerprint sensor interrupt threshold, the method comprising:
    obtaining background noise of a wakeup region on a fingerprint sensor in a terminal device, wherein the wakeup region is a region for detecting whether the fingerprint sensor is touched;
    adding a safety margin to the background noise, to obtain a first threshold;
    determining, according to the first threshold and a safety value, an interrupt threshold for the fingerprint sensor for instructing the fingerprint sensor to generate an interrupt signal for waking up a central processing unit (CPU) of the terminal device, wherein the safety value is configured to prevent the fingerprint sensor from erroneously triggering an interrupt signal to wake up the CPU; and
    wherein obtaining background noise of a wakeup region comprises:
        when there are M wakeup regions on the fingerprint sensor, obtaining background noise of each wakeup region; and
        using a largest background noise of the obtained background noise as background noise of the M wakeup regions, wherein M is an integer greater than 1.

3. The method according to claim 1, wherein the obtained background noise of the wakeup region meets the following formula:

$$A_n = \frac{a_1 + a_2 + a_3 + \ldots + a_n}{n},$$

wherein $A_n$ represents the background noise of the wakeup region, $a_i$ represents a pixel value of an $i^{th}$ local region in the wakeup region, i is an integer not less than 1 and not greater than n, n represents a quantity of local regions comprised in the wakeup region, and n is an integer greater than 0.

4. A fingerprint recognition apparatus, comprising:
    a processor; and
    memory coupled to the processor, the memory comprising instructions that, when executed by the processor, cause the apparatus to:
        obtain background noise of a wakeup region on a fingerprint sensor in a terminal device, wherein the wakeup region is a region for detecting whether the fingerprint sensor is touched;
        add a safety margin to the background noise, to obtain a first threshold; and
        deter nine, according to the first threshold and a safety value, an interrupt threshold for the fingerprint sensor for instructing the fingerprint sensor to generate an interrupt signal for waking up a central processing unit (CPU) of the terminal device, wherein the safety value is configured to prevent the fingerprint sensor from erroneously triggering an interrupt signal to wake up the CPU, wherein:

when the first threshold is less than the safety value, use the first threshold as the interrupt threshold for the fingerprint sensor; or when the first threshold is greater than the safety value, use the safety value as the interrupt threshold for the fingerprint sensor.

5. A fingerprint recognition apparatus, comprising:
a processor; and
memory coupled to the processor, the memory comprising instructions that, when executed by the processor, cause the apparatus to:
obtain background noise of a wakeup region on a fingerprint sensor in a terminal device, wherein the wakeup region is a region for detecting whether the fingerprint sensor is touched;
add a safety margin to the background noise, to obtain a first threshold; and
determine, according to the first threshold and a safety value, an interrupt threshold for the fingerprint sensor for instructing the fingerprint sensor to generate an interrupt signal for waking up a central processing unit (CPU) of the terminal device, wherein the safety value is configured to prevent the fingerprint sensor from erroneously triggering an interrupt signal to wake up the CPU, wherein:
when there are M wakeup regions on the fingerprint sensor, obtain background noise of each wakeup region; and
use a largest background noise of the obtained background noise as background noise of the M wakeup regions, wherein M is an integer greater than 1.

6. The apparatus according to claim 4, wherein the obtained background noise of the wakeup region meets the following formula:

$$A_n = \frac{a_1 + a_2 + a_3 + \ldots + a_n}{n},$$

wherein $A_n$ represents the background noise of the wakeup region, $a_i$ represents a pixel value of an $i^{th}$ local region in the wakeup region, i is an integer not less than 1 and not greater than n, n represents a quantity of local regions comprised in the wakeup region, and n is an integer greater than 0.

7. A terminal device, comprising:
a fingerprint sensor configured to generate an interrupt signal;
a central processing unit (CPU);
memory comprising instructions that, when executed by the CPU, cause the terminal device to:
obtain background noise of a wakeup region on the fingerprint sensor, wherein the wakeup region is a region for detecting whether the fingerprint sensor is touched,
add a safety margin to the background noise, to obtain a first threshold; and
determine, according to the first threshold and a safety value, an interrupt threshold for the fingerprint sensor for instructing the fingerprint sensor to generate an interrupt signal to wake up the CPU, wherein the safety value is configured to prevent the fingerprint sensor from erroneously triggering an interrupt signal to wake up the CPU, wherein:

when the first threshold is less than the safety value, use the first threshold as the interrupt threshold for the fingerprint sensor to generate an interrupt signal; or when the first threshold is greater than the safety value, use the safety value as the interrupt threshold for the fingerprint sensor to generate an interrupt signal.

8. A terminal device, comprising:
a fingerprint sensor configured to generate an interrupt signal;
a central processing unit (CPU);
memory comprising instructions that, when executed by the CPU, cause the terminal device to:
obtain background noise of a wakeup region on the fingerprint sensor, wherein the wakeup region is a region for detecting whether the fingerprint sensor is touched,
add a safety margin to the background noise, to obtain a first threshold; and
determine, according to the first threshold and a safety value, an interrupt threshold for the fingerprint sensor for instructing the fingerprint sensor to generate an interrupt signal to wake up the CPU, wherein the safety value is configured to prevent the fingerprint sensor from erroneously triggering an interrupt signal to wake up the CPU, wherein:
when there are M wakeup regions on the fingerprint sensor, obtain background noise of each wakeup region; and
use a largest background noise of the obtained background noise as background noise of the M wakeup regions, wherein M is an integer greater than 1.

9. The terminal device according to claim 7, wherein the obtained background noise of the wakeup region meets the following formula:

$$A_n = \frac{a_1 + a_2 + a_3 + \ldots + a_n}{n},$$

wherein $A_n$ represents the background noise of the wakeup region, $a_i$ represents a pixel value of an $i^{th}$ local region in the wakeup region, i is an integer not less than 1 and not greater than n, n represents a quantity of local regions comprised in the wakeup region, and n is an integer greater than 0.

10. The method according to claim 2, wherein the obtained background noise of the wakeup region meets the following formula:

$$A_n = \frac{a_1 + a_2 + a_3 + \ldots + a_n}{n},$$

wherein $A_n$ represents the background noise of the wakeup region, $a_i$ represents a pixel value of an $i^{th}$ local region in the wakeup region, i is an integer not less than 1 and not greater than n, n represents a quantity of local regions comprised in the wakeup region, and n is an integer greater than 0.

11. The apparatus according to claim 5, wherein the obtained background noise of the wakeup region meets the following formula:

$$A_n = \frac{a_1 + a_2 + a_3 + \ldots + a_n}{n},$$

wherein $A_n$ represents the background noise of the wakeup region, $a_i$ represents a pixel value of an $i^{th}$ local region in the wakeup region, i is an integer not less than 1 and not greater than n, n represents a quantity of local regions comprised in the wakeup region, and n is an integer greater than 0.

12. The terminal device according to claim 8, wherein the obtained background noise of the wakeup region meets the following formula:

$$A_n = \frac{a_1 + a_2 + a_3 + \ldots + a_n}{n},$$

wherein $A_n$ represents the background noise of the wakeup region, $a_i$ represents a pixel value of an $i^{th}$ local region in the wakeup region, i is an integer not less than 1 and not greater than n, n represents a quantity of local regions comprised in the wakeup region, and n is an integer greater than 0.

* * * * *